United States Patent
Lu et al.

(10) Patent No.: US 11,575,122 B2
(45) Date of Patent: Feb. 7, 2023

(54) ELECTRODE WITH ENHANCED STATE OF CHARGE ESTIMATION

(71) Applicant: GM Global Technology Operations LLC, Detroit, MI (US)

(72) Inventors: Yong Lu, Shanghai (CN); Dewen Kong, Shanghai (CN); Mengyan Hou, Shanghai (CN); Zhe Li, Shanghai (CN); Haijing Liu, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 538 days.

(21) Appl. No.: 16/598,244

(22) Filed: Oct. 10, 2019

(65) Prior Publication Data

US 2021/0036385 A1 Feb. 4, 2021

(51) Int. Cl.
| | |
|---|---|
| *H01M 4/36* | (2006.01) |
| *H01M 4/131* | (2010.01) |
| *H01M 4/1391* | (2010.01) |
| *H01M 10/0525* | (2010.01) |
| *H01M 10/052* | (2010.01) |
| *H01M 10/0585* | (2010.01) |
| *H01M 4/04* | (2006.01) |

(52) U.S. Cl.
CPC ......... *H01M 4/364* (2013.01); *H01M 4/0404* (2013.01); *H01M 4/131* (2013.01); *H01M 4/1391* (2013.01); *H01M 10/052* (2013.01); *H01M 10/0525* (2013.01); *H01M 10/0585* (2013.01)

(58) Field of Classification Search
None
See application file for complete search history.

(56) References Cited

U.S. PATENT DOCUMENTS

| | | | | |
|---|---|---|---|---|
| 2009/0081551 | A1* | 3/2009 | Hoshina | H01M 4/131 429/231.95 |
| 2009/0155692 | A1* | 6/2009 | Park | C01G 23/005 429/231.1 |
| 2016/0276663 | A1* | 9/2016 | Yoshida | H01M 4/485 |
| 2017/0077504 | A1* | 3/2017 | Ise | H01M 4/366 |
| 2018/0233741 | A1* | 8/2018 | Park | H01G 11/86 |

FOREIGN PATENT DOCUMENTS

| | | | | |
|---|---|---|---|---|
| CN | 108054374 | A * | 5/2018 | ........ H01M 10/0525 |
| CN | 109473641 | A * | 3/2019 | |
| CN | 110277554 | A * | 9/2019 | ........ H01M 10/0525 |

* cited by examiner

*Primary Examiner* — Robert S Carrico
(74) *Attorney, Agent, or Firm* — Vivacqua Crane PLLC

(57) ABSTRACT

An anode electrode with enhanced state of charge estimation is provided. The anode electrode comprises anode layer and a negative current collector. The negative current collector has a first side and a second side. The anode layer comprises lithium-titanium oxide and a second anode material (e.g. niobium-titanium oxide) disposed on at least one of the first and second sides of the negative current collector with single-layer or layer-by-layer coated structures. The second anode material (e.g. niobium-titanium oxide) can be physically blended with lithium-titanium oxide or be at least partially coated on the surface of lithium-titanium oxide or their combinations. The anode electrode further comprises a binder and a conductive carbon.

18 Claims, 4 Drawing Sheets

ELECTRODE WITH ENHANCED STATE OF CHARGE ESTIMATION

INTRODUCTION

The present disclosure relates to lithium ion battery electrodes and more particularly anode electrodes for lithium ion batteries with enhanced state of charge estimation.

With the rapid popularization of information-related devices, communication devices, and so on, the importance of developing batteries that can be used as power supplies for these devices has grown. Moreover, in the automobile industry, the development of high-power-output, large-energy-density batteries that can be used in electric automobiles or hybrid automobiles is progressing. Among the various types of batteries that currently exist, lithium-ion batteries are one focus of attention due to a favorable power density (fast charging/discharging performance), a high energy density, along cycle life, and an ability to be formed into a wide variety of shapes and sizes so as to efficiently fill available space in electric vehicles, cellular phones, and other electronic devices.

For the application of lithium-ion batteries, energy management is important. In other words, accurate state of charge estimation directly reflects the instant state of battery in use. Among all the estimation methods, open circuit voltage-based method can respond the most quickly and the relevant algorithm is much too simpler and easily to be calibrated. Thus, it is preferable to be used in some situations. However, for some battery chemistry that have long and flat charge/discharge plateau, such as lithium-titanium oxide, it is hard to accurately estimate the state of charge. Improvements for electrodes are needed.

SUMMARY

Thus, while current lithium-ion batteries achieve their intended purpose, there is a need for a new and improved design.

In one embodiment, an anode electrode for a battery with enhanced state of charge estimation is provided. The anode electrode comprises a negative current collector and an anode layer. The negative current collector has a first side and a second side. The anode layer is disposed on at least one of the first and second sides of the negative current collector. The anode layer comprises a lithium-titanium oxide, a second anode material (e.g. niobium-titanium oxide), binder and a conductive carbon.

In one example, the anode layer comprises a first layer and a second layer. The first layer has lithium-titanium oxide only or lithium-titanium oxide and a second anode material (e.g. niobium-titanium oxide). The second layer comprises a second anode material (e.g. niobium-titanium oxide) only or a second anode material (e.g. niobium-titanium oxide) and lithium-titanium oxide.

In one embodiment, the first layer is disposed on the first side of the negative current collector and wherein the second layer is disposed on the first layer such that the first layer is disposed between the second layer and first side of the negative current collector.

In another embodiment, the second layer is disposed on the first side of the negative current collector and wherein the first layer is disposed on the second layer such that the second layer is disposed between the first layer and first side of the negative current collector.

In another embodiment, the first layer is disposed on the first side of the negative current collector and wherein the second layer is disposed on the second side of the negative current collector such that the current collector is disposed between the first layer and the second layer.

In these embodiments, the anode layer may comprise a weight ratio of lithium-titanium oxide to a second anode material (e.g. niobium-titanium oxide) of about 99% to about 1%. Moreover, lithium-titanium oxide is physically blended with a second anode material (e.g. niobium-titanium oxide) or is at least partially coated with the second anode material (e.g. niobium-titanium oxide).

In another embodiment, a battery with enhanced state of charge estimation is provided. The battery comprises a positive electrode, a negative electrode, and a separator. The positive electrode comprises a cathode layer and a positive current collector. The negative electrode comprises anode layer and a negative current collector. The electrodes for battery further comprise a binder and a conductive carbon. The negative current collector has a first side and a second side. The anode layer comprises lithium-titanium oxide and a second anode material (e.g. niobium-titanium oxide) disposed on at least one of the first and second sides of the negative current collector. The separator layer disposed between the positive electrode and the negative electrode.

In one example, the anode layer comprises a first layer and a second layer. The first layer has lithium-titanium oxide only or lithium-titanium oxide and a second anode material (e.g. niobium-titanium oxide). The second layer comprises a second anode material (e.g. niobium-titanium oxide) only or a second anode material (e.g. niobium-titanium oxide) and lithium-titanium oxide.

In another embodiment, the first layer is disposed on the first side of the negative current collector. Moreover, the second layer is disposed on the first layer such that the first layer is disposed between the second layer and first side of the negative current collector.

In yet another embodiment, the second layer is disposed on the first side of the negative current collector. Moreover, the first layer is disposed on the second layer such that the second layer is disposed between the first layer and first side of the negative current collector.

In another embodiment, the first layer is disposed on the first side of the negative current collector. The second layer is disposed on the second side of the negative current collector such that the current collector is disposed between the first layer and the second layer.

In these embodiments, the anode layer may comprise a weight ratio of lithium-titanium oxide to a second anode material (e.g. niobium-titanium oxide) of about 99% to about 1%. Moreover, lithium-titanium oxide is physically blended with a second anode material (e.g. niobium-titanium oxide) or is at least partially coated with the second anode material (e.g. niobium-titanium oxide).

In yet another example, a method of making an electrode for a battery with enhanced state of charge estimation is provided. In this example, the method comprises mixing a niobium precursor, a titanium precursor, lithium titanium oxide, and a solvent to define a precursor solution. The method further comprises drying the precursor solution at between about 600 C and about 1200 C for between 5 to 15 hours to remove the solvent, defining an electrode material comprising lithium-titanium oxide and a second anode material (e.g. niobium-titanium oxide). Moreover, the lithium-titanium oxide is at least partially coated by the second anode material (e.g. niobium-titanium oxide). The method further comprises coating the electrode material on at least one side of a negative current collector.

In one example of the method, the niobium precursor and titanium precursor have a molar ratio of between about 1:1 and about 5:1. Moreover, the niobium precursor comprises at least one of $NbCl_5$, $C_{10}H_{25}O_5Nb$, and $C_{20}H_{45}O_5Nb$ etc. and the titanium precursor comprises at least one of $C_{16}H_{36}O_4Ti$ and $C_{12}H_{28}O_4Ti$ etc. And, the lithium-titanium oxide and the electrode material have a weight ratio of between about 0.01 to about 0.99.

In one example of the method, the step of mixing comprises mixing the solvent with lithium-titanium oxide and one of the niobium precursor and the titanium precursor (e.g. niobium precursor), defining a solution. The method further comprises, while stirring the solution, adding the other of the niobium precursor and the titanium precursor (e.g. titanium precursor) to define the precursor solution.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
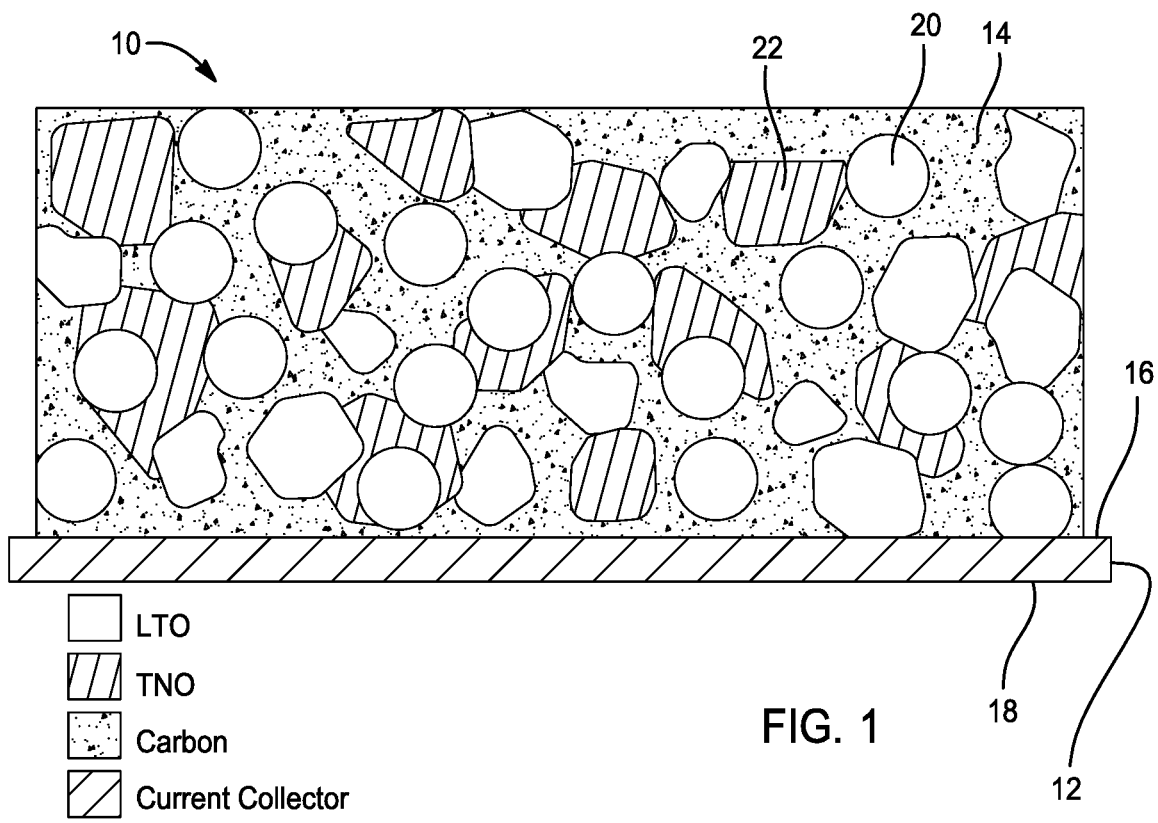
FIG. 1 is a cross-sectional view of a conceptual image of an anode electrode for a battery with enhanced state of charge estimation in accordance with one embodiment of the disclosure.

Referring to FIG. 1, an anode electrode 10 for a battery with enhanced state of charge estimation is provided in accordance with one embodiment of the present disclosure. As shown, the anode electrode 10 comprises a negative current collector 12 and an anode layer 14. In this embodiment, the negative current collector 12 has a first side 16 and a second side 18. Moreover, the negative current collector is comprised of a conductive material such as metal, metal alloy, or any other suitable material.

Preferably, the anode layer 14 is disposed on at least one of the first and second sides 16, 18 of the negative current collector 12. As shown, the anode layer 14 is disposed on the first side 16 of the negative current collector 12. In this embodiment, the anode layer 14 comprises lithium-titanium oxide 20 and a second anode material (e.g. niobium-titanium oxide) 22. On a materials level, the anode layer 14 preferably comprises a weight ratio of lithium-titanium oxide to a second anode material (e.g. niobium-titanium oxide) of about 99% to about 1%.

Figure 2A:
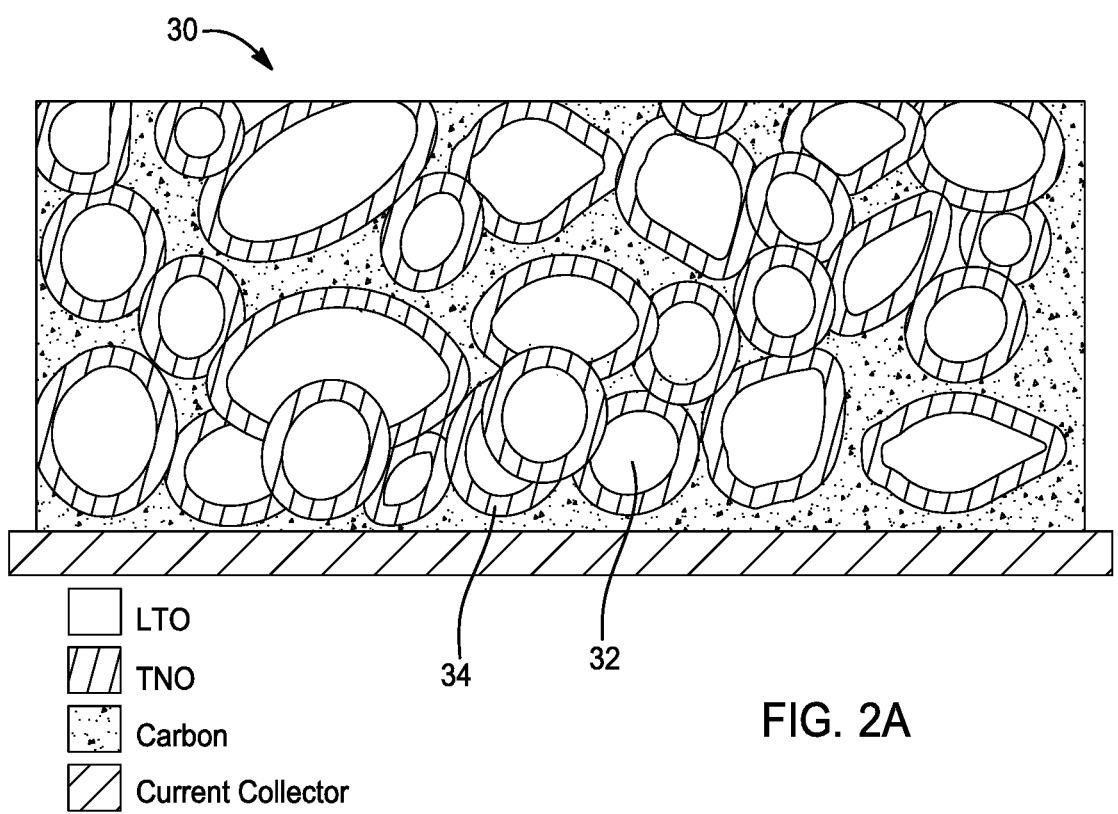
FIG. 2A is a cross-sectional view of a conceptual image on a material level of another anode electrode for a battery with enhanced state of charge estimation in accordance with another embodiment.
Figure 2B:
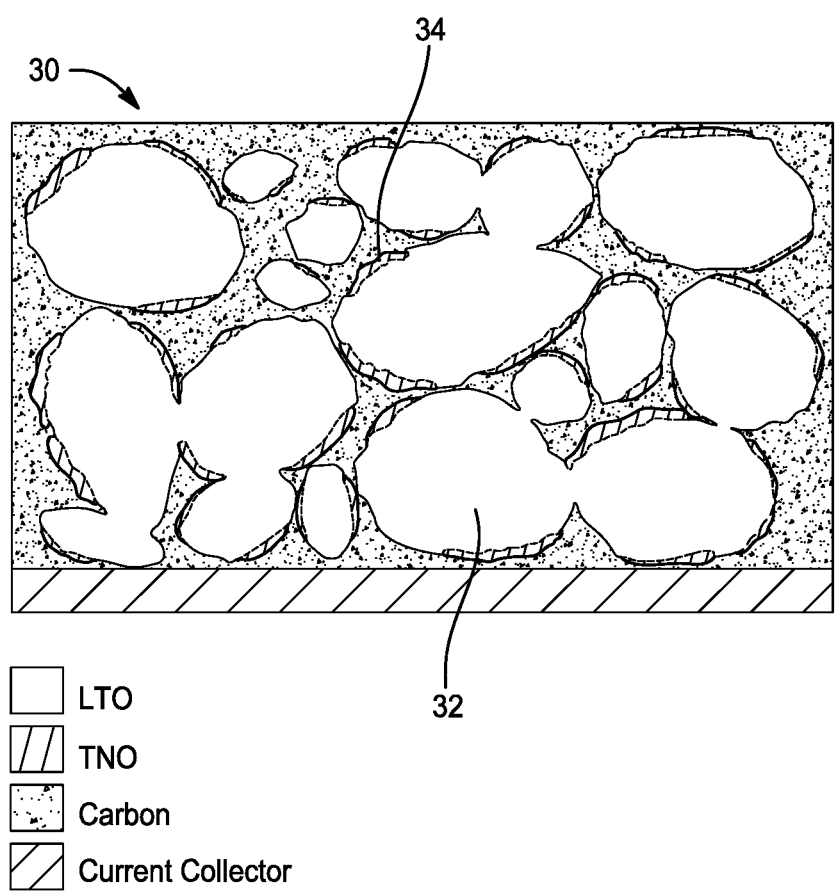
FIG. 2B is a cross-sectional view of a conceptual image on a material level of yet another anode electrode for a batter in accordance with yet another embodiment.

FIGS. 2A and 2B depict an anode electrode 30 in accordance with another embodiment of the present disclosure. As shown, the lithium-titanium oxide 32 is at least partially coated with a second anode material (e.g. niobium-titanium oxide) 34. Referring to FIG. 2A, lithium-titanium oxide 32 is fully coated by a second anode material (e.g. niobium-titanium oxide) 34. Referring to FIG. 2B, lithium-titanium oxide 32 is partially coated by a second anode material (e.g. niobium-titanium oxide) 34. As will be described in greater detail below, the degree of coating of the lithium-titanium oxide with a second anode material (e.g. niobium-titanium oxide) is related to a molar ratio of a niobium precursor and titanium precursor used in preparing the electrode. The weight ratio of lithium-titanium oxide to a second anode material (e.g. niobium-titanium oxide) of about 99% to about 1%.

Figure 3:
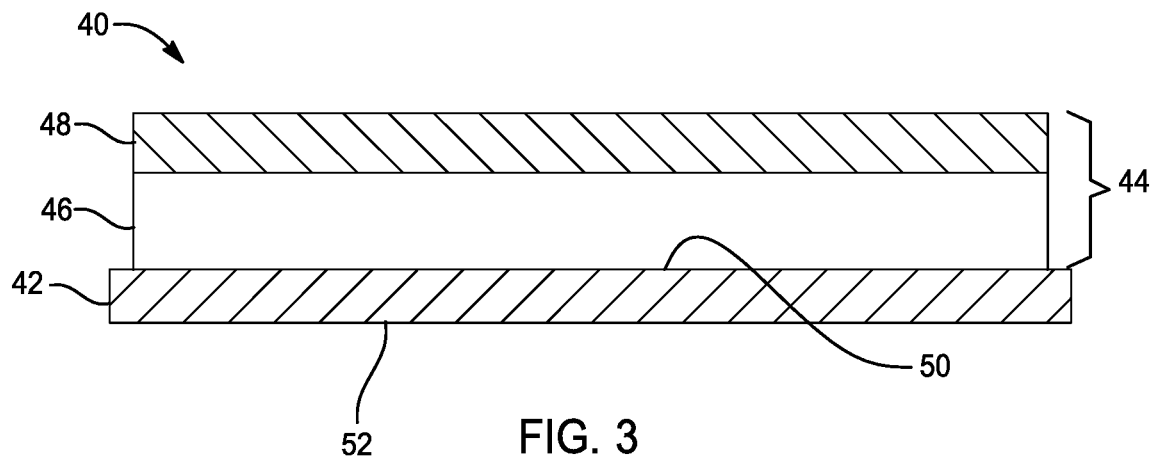
FIG. 3 is a cross-sectional view of a conceptual image of an anode electrode having first and second layers according to one embodiment of the present disclosure.

As shown in FIG. 3, an electrode 40 comprises a negative current collector 42 and an anode layer 44 having a first layer 46 and a second layer 48. Preferably, the first layer 46 has lithium-titanium oxide only or lithium-titanium oxide and a second anode material (e.g. niobium-titanium oxide) in a weight ratio of between 0 to 1. The second layer 48 may comprise a second anode material (e.g. niobium-titanium oxide) only or a second anode material (e.g. niobium-titanium oxide) and lithium-titanium oxide in another weight ratio of between 0 to 1. In this embodiment, the second layer (a second anode material (e.g. niobium-titanium oxide) only) and the first layer (lithium-titanium oxide only) have a weight ratio of between about 0.01 to about 0.99.

As shown, the first layer 46 is disposed on a first side 50 of the negative current collector 42 and the second layer 48 is disposed on the first layer 46 such that the first layer 46 is disposed between the second layer 48 and first side 50 of the negative current collector 42.

Figure 4:
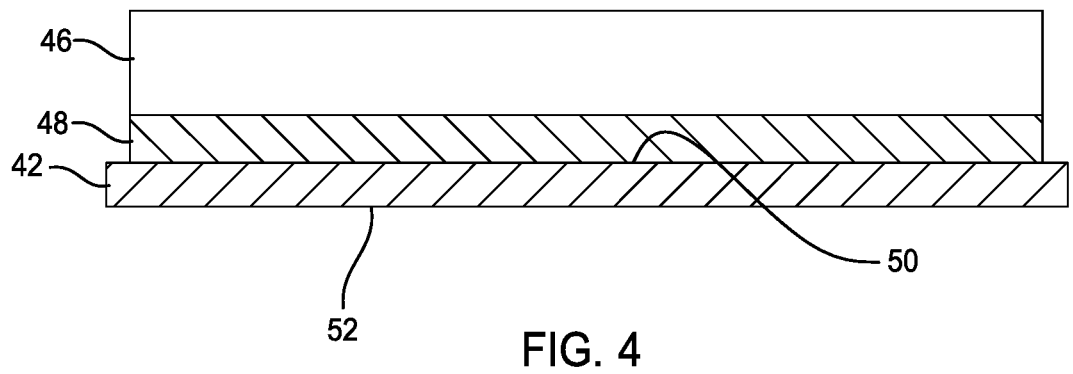
FIG. 4 is a cross-sectional view of a conceptual image of another anode electrode having first and second layers according to another embodiment of the present disclosure.

As shown in FIG. 4, the second layer 48 is disposed on the first side 50 of the negative current collector 42 and wherein the first layer 46 is disposed on the second layer 48 such that the second layer 48 is disposed between the first layer 46 and first side 50 of the negative current collector 42.

Figure 5:
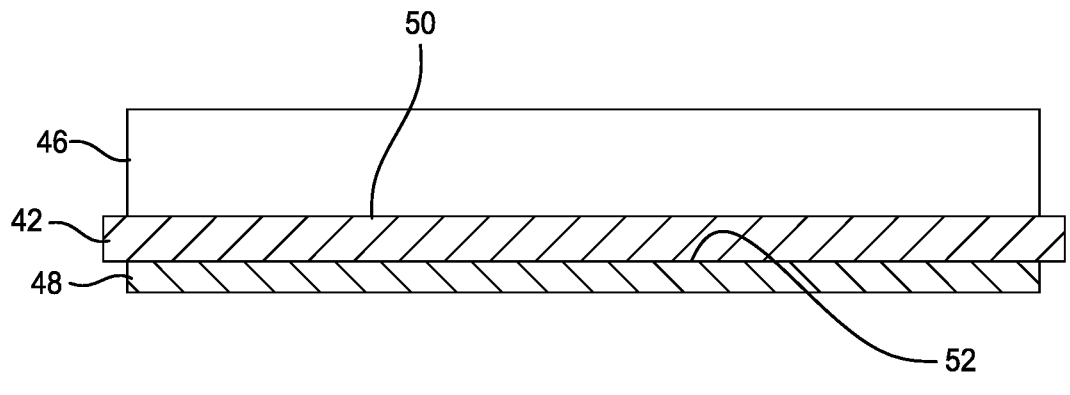
FIG. 5 is a cross-sectional view of a conceptual image of yet another anode electrode having first and second layers in accordance with yet another embodiment.

As shown in FIG. 5, the first layer 46 is disposed on the first side 50 of the negative current collector 42 and the second layer 48 is disposed on the second side 52 of the negative current collector 42 such that the current collector 42 is disposed between the first layer 46 and the second layer 48.

Figure 6:
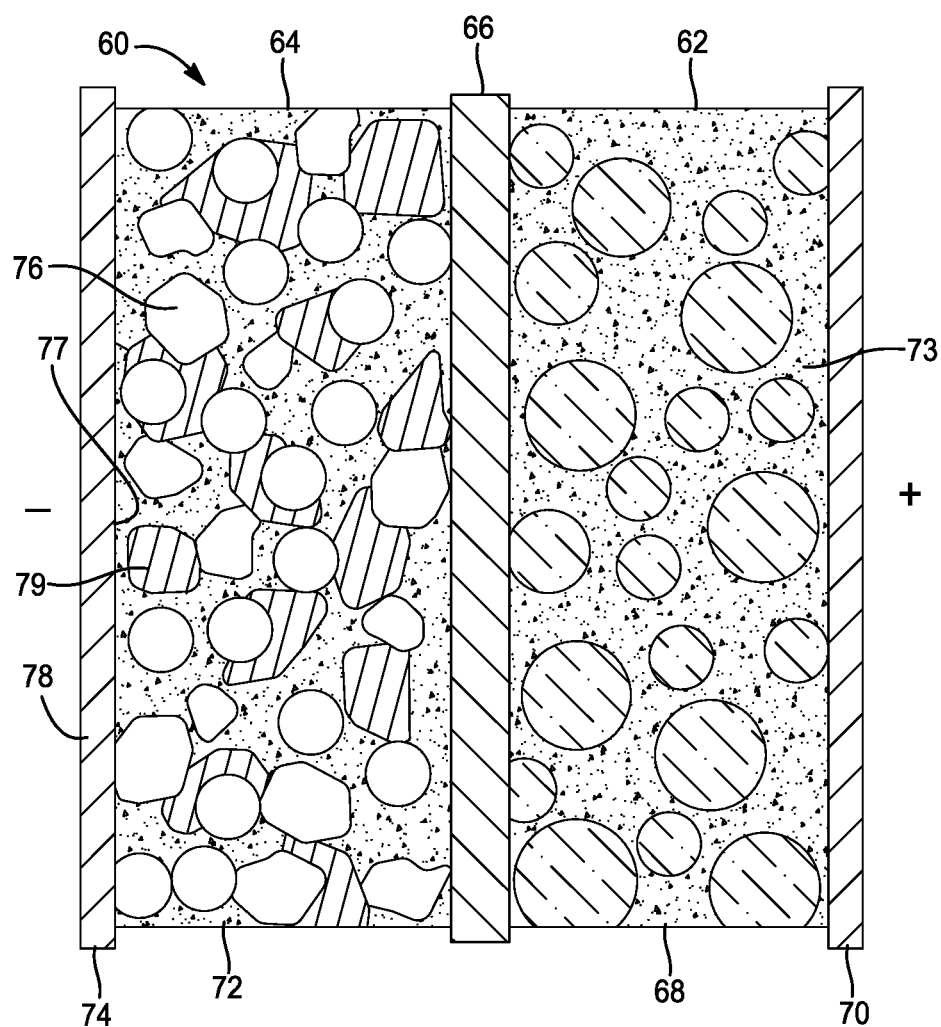
FIG. 6 is a cross-sectional view of a conceptual image of a battery with enhanced state of charge estimation according to one example of the present disclosure.

FIG. 6 illustrates a battery 60 with enhanced state of charge estimation in accordance with another embodiment of the present disclosure. As shown, on a material level, the battery 60 comprises a positive electrode 62, a negative electrode 64, and a separator 66. The positive electrode 62 comprises a cathode layer 68 and a positive current collector 70 comprising a conductive material. The negative electrode 64 comprises anode layer 72 and a negative current collector 74 comprising a conductive material. As shown, the negative current collector 74 has a first side 76 and a second side 78.

In this embodiment, the anode layer 72 comprises lithium-titanium oxide and a second anode material (e.g. niobium-titanium oxide) disposed on at least one of the first and second sides 76, 78 of the negative current collector 74. The anode layer 72 comprises a weight ratio of lithium-titanium oxide to a second anode material (e.g. niobium-titanium oxide) of about 99% to about 1%. As shown, the separator layer 66 is disposed between the positive electrode 62 and the negative electrode 64. In some embodiments, the battery further comprises a binder and a conductive carbon.

On a material level, the lithium-titanium oxide is at least partially coated with a second anode material (e.g. niobium-titanium oxide). As will be described in greater detail below, the degree of coating of the lithium-titanium oxide with a second anode material (e.g. niobium-titanium oxide) is related to a molar ratio of a niobium precursor and titanium precursor used in preparing the electrode.

As in the previous embodiments, the anode layer may comprise a first layer and a second layer. As previously provided, the first layer may comprise lithium-titanium oxide only or lithium-titanium oxide and a second anode material (e.g. niobium-titanium oxide) in one weight ratio of between 0 to 1. The second layer 48 may comprise a second anode material (e.g. niobium-titanium oxide) only or a second anode material (e.g. niobium-titanium oxide) and lithium-titanium oxide in another weight ratio of between 0 to 1.

In one embodiment on an electrode level, the first layer may be disposed on the first side of the negative current collector. The second layer may be disposed on the first layer such that the first layer is disposed between the second layer and first side of the negative current collector.

In another embodiment, the second layer may be disposed on the first side of the negative current collector. The first layer is disposed on the second layer such that the second layer is disposed between the first layer and first side of the negative current collector.

In yet another embodiment, the first layer may be disposed on the first side of the negative current collector. The second layer may be disposed on the second side of the negative current collector such that the current collector is disposed between the first layer and the second layer.

Figure 7:
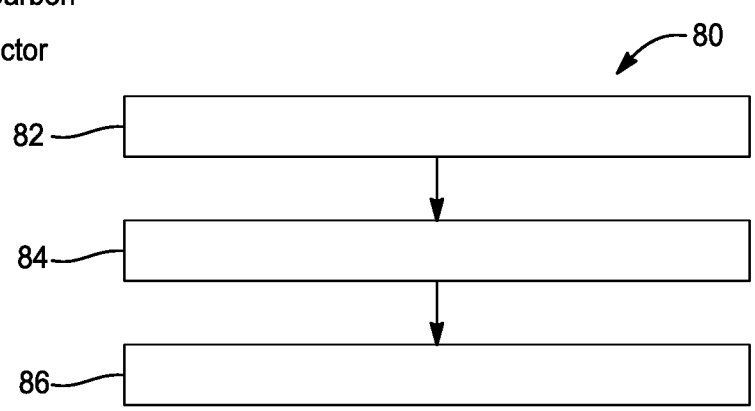
FIG. 7 is a flowchart depicting a method of making an electrode for a battery with enhanced state of charge estimation in accordance with one example of the present disclosure.

FIG. 7 illustrates a method 80 of making an electrode for a battery with enhanced state of charge estimation in accordance with another example of the present disclosure. As shown, the method 80 comprises a step 82 of mixing a niobium precursor, a titanium precursor, lithium titanium oxide, and a solvent to define a precursor solution. In this embodiment, the niobium precursor may comprise at least one of $NbCl_5$, $C_{10}H_{25}O_5Nb$, and $C_{20}H_{45}O_5Nb$ etc. and the titanium precursor may comprise at least one of $C_{16}H_{36}O_4Ti$ and $C_{12}H_{28}O_4Ti$ etc.

As shown in FIG. 7, the method further comprises a step 84 of drying the precursor solution at between about 600 C and about 1200 C for between 5 to 15 hours to remove the solvent. As a result, the step of drying defines or produces an electrode material comprising lithium-titanium oxide and a second anode material (e.g. niobium-titanium oxide). In one embodiment, the lithium-titanium oxide and the electrode material have a weight ratio of between about 0.01 to about 0.99. As shown, the method further comprises a step 86 of coating the electrode material on at least one side of a negative current collector, resulting in the electrode.

On a material level, the lithium-titanium oxide of the electrode material is at least partially coated with a second anode material (e.g. niobium-titanium oxide) in one embodiment. It is understood that the degree of coating of the lithium-titanium oxide with a second anode material (e.g. niobium-titanium oxide) is directly related to molar ratio of the niobium precursor and titanium precursor. In this embodiment, the niobium precursor and titanium precursor have a molar ratio of between about 1:1 and about 5:1.

In one aspect of the present disclosure, the step of mixing comprises mixing the solvent with lithium-titanium oxide and one of the niobium precursor and the titanium precursor (e.g. niobium precursor), defining a solution. The method further comprises, while stirring the solution, adding the other of the niobium precursor and the titanium precursor (e.g. titanium precursor) to define the precursor solution. In other words, the other of the two (the niobium precursor, the titanium precursor) is then added to the solution while stirring. For example, if the niobium precursor and the lithium-titanium oxide are mixed with the solvent, then the titanium precursor is added to the solution, while stirring, to define the precursor solution.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An anode electrode for a battery with enhanced state of charge estimation, the anode electrode comprising:
   a negative current collector comprising a conductive material, the negative current collector having a first side and a second side; and
   an anode layer disposed on at least one of the first and second sides of the negative current collector,
   wherein a niobium precursor, a titanium precursor, and a lithium-titanium oxide are mixed with a solvent to define a precursor solution, and the precursor solution is dried at between about 600C and about 1200C for between 5-15 hours to remove the solvent, thereby forming the anode layer comprising the lithium-titanium oxide and a second anode material in a weight ratio of between 0.01 and 0.99; and wherein the niobium precursor and titanium precursor have a molar ratio of between about 1:1 and about 5:1;
   wherein the lithium-titanium oxide is at least partially coated with the second anode material;
   wherein the second anode material is at least one of group of materials who have inclined charge and discharge plateau comprising: titanium-oxides, niobium-oxides, lithium-metal oxides, niobium-metal oxides, and niobium-titanium oxides;
   a binder; and
   a conductive carbon.

2. The anode electrode of claim 1 wherein the lithium-titanium oxide is physically blended with the second anode material.

3. The anode electrode of claim 1 wherein the anode layer comprises a first layer and a second layer, the first layer having lithium-titanium oxide, the second layer comprising the second anode material and lithium-titanium oxide.

4. The anode electrode of claim 3 wherein the first layer is disposed on the first side of the negative current collector and wherein the second layer is disposed on the first layer such that the first layer is disposed between the second layer and first side of the negative current collector.

5. The anode electrode of claim 3 wherein the second layer is disposed on the first side of the negative current collector and wherein the first layer is disposed on the second layer such that the second layer is disposed between the first layer and first side of the negative current collector.

6. The anode electrode of claim 3 wherein the first layer is disposed on the first side of the negative current collector and wherein the second layer is disposed on the second side of the negative current collector such that the current collector is disposed between the first layer and the second layer.

7. The anode electrode of claim 3 wherein the first layer comprises a weight ratio of the lithium-titanium oxide to the second anode material of about 99% to about 1%; and
the second layer comprises a weight ratio of the lithium-titanium oxide to the second anode material of about 1% to about 99%;
wherein the weight ratio values of the first layer and the second layer are different.

8. The anode electrode of claim 3 wherein the lithium-titanium oxide is physically blended with the second anode material; or
the lithium-titanium oxide is at least partially coated with the second anode material;
wherein the second anode material is at least one of group of materials who have inclined charge and discharge plateau comprising: titanium-oxides, niobium-oxides, lithium-metal oxides, and niobium-metal oxides and carbon material.

9. A battery with enhanced state of charge estimation, the battery comprising:
a positive electrode comprising a cathode layer and a positive current collector comprising a conductive material;
a negative electrode comprising an anode layer and a negative current collector comprising a conductive material, the negative current collector having a first side and a second side, wherein a niobium precursor, a titanium precursor, and a lithium-titanium oxide are mixed with a solvent to define a precursor solution, and the precursor solution is dried at between about 600C and about 1200C for between 5-15 hours to remove the solvent, thereby forming the anode layer comprising the lithium-titanium oxide and a second anode material in a weight ratio of between 0.01 and 0.99; and wherein the niobium precursor and titanium precursor have a molar ratio of between about 1:1 and about 5:1;
wherein the anode layer comprises a first layer and a second layer, the first layer having lithium-titanium oxide and a second anode material, the second layer comprising the second anode material only;
wherein the lithium-titanium oxide is at least partially coated with the second anode material;
wherein the second anode material is at least one of group of materials who have inclined charge and discharge plateau comprising: titanium-oxides, niobium-oxides, lithium-metal oxides, niobium-metal oxides, and niobium-titanium oxides;
a separator layer disposed between the positive electrode and the negative electrode;
a binder; and
a conductive carbon.

10. The battery of claim 9 wherein the first layer is disposed on the first side of the negative current collector and wherein the second layer is disposed on the first layer such that the first layer is disposed between the second layer and first side of the negative current collector.

11. The battery of claim 9 wherein the second layer is disposed on the first side of the negative current collector and wherein the first layer is disposed on the second layer such that the second layer is disposed between the first layer and first side of the negative current collector.

12. The battery of claim 9 wherein the first layer is disposed on the first side of the negative current collector and wherein the second layer is disposed on the second side of the negative current collector such that the current collector is disposed between the first layer and the second layer.

13. The battery of claim 9 wherein the first layer comprises a weight ratio of the lithium-titanium oxide to the second anode material of about 0.01 to about 0.99; and
the second layer comprises a weight ratio of the lithium-titanium oxide to the second anode material of about 0.01 to about 0.99;
wherein the weight ratio values of the first layer and the second layer are different.

14. The battery of claim 9 wherein the lithium-titanium oxide is physically blended with the second anode material.

15. A method of making an electrode for a battery with enhanced state of charge estimation, the method comprising:
mixing a niobium precursor, a titanium precursor, lithium titanium oxide, and a solvent to define a precursor solution,
wherein the niobium precursor and titanium precursor have a molar ratio of between about 1:1 and about 5:1;
drying the precursor solution at between about 600C and about 1200C for between about 5-15 hours to remove the solvent, defining an electrode material comprising lithium-titanium oxide and a second anode material, the lithium-titanium oxide being at least partially coated by a second anode material; and
coating the electrode material on at least one side of a negative current collector.

16. The method of claim 15 wherein the niobium precursor comprises at least one of $NbCl_5$, $CioH_{25}O_5Nb$, and $C_{20}H_{45}O_5Nb$ and wherein the titanium precursor comprises at least one of $Ci_6H_{36}O_4Ti$ and $C_{12}H_{28}O_4Ti$.

17. The method of claim 16 wherein the lithium-titanium oxide and the electrode material have a weight ratio of between about 0.01 to about 0.99.

18. The method of claim 16 wherein the step of mixing comprises:
physically mixing the solvent with lithium-titanium oxide and one of the niobium precursor and the titanium precursor, defining a solution; and
while stirring the solution, adding the other of the niobium precursor and the titanium precursor to define the precursor solution.

* * * * *